United States Patent
Kubo et al.

(10) Patent No.: US 6,976,469 B2
(45) Date of Patent: Dec. 20, 2005

(54) DIRECT FUEL INJECTION TYPE INTERNAL COMBUSTION ENGINE

(75) Inventors: Masaaki Kubo, Yokohama (JP); Atsushi Teraji, Yokohama (JP); Koji Hiraya, Yokohama (JP); Isamu Hotta, Yokohama (JP)

(73) Assignee: Nissan Motor Co., Ltd., Yokoama (JP)

( * ) Notice: Subject to any disclaimer, the term of this patent is extended or adjusted under 35 U.S.C. 154(b) by 0 days.

(21) Appl. No.: 10/897,020

(22) Filed: Jul. 23, 2004

(65) Prior Publication Data

US 2005/0028784 A1 Feb. 10, 2005

(30) Foreign Application Priority Data

Aug. 7, 2003 (JP) ............................. 2003-288318

(51) Int. Cl.[7] ............................. F02B 3/04; F02B 17/00; F02M 61/18
(52) U.S. Cl. .................. 123/295; 123/298; 123/299; 123/305; 239/533.12
(58) Field of Search .................. 123/276, 279, 123/295, 298, 299, 305; 239/5, 533.2, 533.3, 239/533.4, 533.12

(56) References Cited

U.S. PATENT DOCUMENTS

| | | | |
|---|---|---|---|
| 6,311,665 B1 * | 11/2001 | Yasuoka et al. | 123/276 |
| 6,390,059 B1 * | 5/2002 | Shiraishi et al. | 123/298 |
| 6,557,532 B1 * | 5/2003 | Nakayama et al. | 123/299 |
| 6,668,792 B2 * | 12/2003 | Yamauchi et al. | 123/295 |
| 6,681,739 B2 * | 1/2004 | Mamiya et al. | 123/295 |
| 6,832,594 B2 * | 12/2004 | Hiraya et al. | 123/305 |
| 6,851,408 B2 * | 2/2005 | Hotta et al. | 123/305 |
| 6,880,519 B2 * | 4/2005 | Nakayama et al. | 123/295 |
| 6,920,861 B2 * | 7/2005 | Hayakawa et al. | 123/295 |
| 2002/0129785 A1 * | 9/2002 | Tetsuno et al. | 123/295 |

FOREIGN PATENT DOCUMENTS

JP       11-82028 A       3/1999

* cited by examiner

Primary Examiner—Tony M. Argenbright
(74) Attorney, Agent, or Firm—Foley & Lardner LLP

(57) ABSTRACT

A control unit is used for controlling a direct fuel injection type internal combustion engine. The control unit controls a fuel injection valve to have a first fuel injection mode wherein a penetration force of an injected fuel sharply increases at an initial stage of a fuel injection and thereafter an increasing rate of the penetration force gradually lowers with passage of time and a second fuel injection mode wherein the penetration force of the injected fuel sharply increases at a middle stage of the fuel injection. The control unit further controls the fuel injection valve in a manner to switch the first and second fuel injection modes in accordance with an operation condition of the engine.

14 Claims, 6 Drawing Sheets

DIRECT FUEL INJECTION TYPE INTERNAL COMBUSTION ENGINE

BACKGROUND OF THE INVENTION

1. Field of the Invention

The present invention relates in general to internal combustion engines and more particularly to the internal combustion engines of a direct fuel injection type in which fuel is directly injected into a cavity of the piston in each cylinder to produce an air/fuel mixture and the mixture is ignited by an ignition plug.

2. Description of the Related Art

One of the internal combustion engines of the above-mentioned direct fuel injection type is shown in Laid-open Japanese Patent Application (Tokkaihei) 11-82028, that enables a so-called stratified combustion.

In the engine disclosed in the publication, each piston has a reentrant type cavity, and a fuel injection valve is arranged just above the cavity so that fuel is injected toward the cavity. That is, atomized fuel injected from the injection valve is forced to collide obliquely against a peripheral wall surface of the cavity to produce a circulation of the atomized fuel that is directed toward a center of the cavity thereby to produce an appropriate stratified air-fuel mixture over the cavity. Ignition of the mixture is effected by an ignition plug that is located beside the fuel injection valve.

SUMMARY OF THE INVENTION

As is known in the art, in the internal combustion engines of the above-mentioned direct fuel injection type, a penetration force of the atomized fuel from the fuel injection valve exerts a remarkable influence on production of the stratified air-fuel mixture. It is said that such penetration force is based on a real time and generally constant even when the engine speed and engine load are subjected to a change. Thus, if for example the engine speed is increased, it tends to occur that formation of the air-fuel mixture is not made in time. Accordingly, in fact, the operation condition of the engine that enables formation of an appropriate stratified air-fuel mixture is quite limited.

Accordingly, it is an object of the present invention to provide a direct fuel injection type internal combustion engine that can easily produce an appropriate stratified air-fuel mixture.

Prior to describing the invention in detail, the present invention will be outlined with the aid of the accompanying drawings.

In the direct fuel injection type internal combustion engine of the present invention, there are arranged in each cylinder a fuel injection valve that injects fuel against a cavity of a piston to produce an atomized fuel for an air-fuel mixture and an ignition plug that ignites the air-fuel mixture.

The fuel injection valve has two fuel injection modes, which are, a basic first fuel injection mode wherein the penetration force of the injected fuel sharply increases at an initial stage of the fuel injection and an increasing rate of the penetration force gradually lowers with passage of time and a second fuel injection mode wherein the penetration force sharply increases at a middle stage of the fuel injection, and these two fuel injection modes are switched in accordance with an operation condition of the engine.

That is, when, for example, a fuel injection pressure is relatively low, the valve takes the first fuel injection mode and when the fuel injection pressure is relatively high, the valve takes the second fuel injection mode. That is, when the engine speed is in a lower range, the fuel injection valve takes the first fuel injection mode with a lower fuel injection pressure, and when the engine speed is in a higher range, the fuel injection valve takes the second fuel injection mode with a higher fuel injection pressure, so that a suitable penetration force characteristic of the atomized fuel from the fuel injection valve is obtained.

The above description will be much clarified from the following description.

FIGS. 1A and 1B are respectively a graph and a drawing that are provided for explaining the characteristic of penetration force exhibited by a fuel injection valve employed in the present invention.

In FIG. 1B, the characteristic of penetration force is evaluated with reference to a longitudinal length of the injected atomized fuel, that is, a length from a fuel injection nozzle of the valve to a leading end of the injected atomized fuel.

In the graph of FIG. 1A, there is shown the characteristic of penetration force exhibited by a fuel injection valve when the fuel injection pressure is varied. The graph shows a relation between a time elapsed from a start of the fuel injection and the penetration force. The curve denoted by "Pinj=P1" is a characteristic generally exhibited by a swirl type fuel injection valve and a multi-nozzle type fuel injection valve, that are commonly employed in the direct fuel injection internal combustion engine. The curve "Pinj=P1" shows the characteristic of penetration force when the fuel injection pressure "Pinj" is "P1". As is understood from curve "Pinj=P1", in the above-mentioned swirl type and multi-nozzle type fuel injection valves, the penetration force sharply increases at an initial stage of the fuel injection and the increasing rate of the force gradually lowers with passage of time. In other words, in such fuel injection valves, a sharp increase of the penetration force is not effected at a middle stage of the fuel injection. Hitherto, it has been thought that the characteristic indicated by curve "Pinj=P1" is generally constant and shows substantially no change even when the fuel injection pressure "Pinj" is varied.

Due to various experiments carried out by the inventors, it has been revealed that when the fuel injection pressure "Pinj" is increased higher than a critical value "Pcrit", the penetration force is sharply increased at the middle stage of the fuel injection as is indicated by curve "Pinj=P2". That is, under such pressure condition, there is produced an atomized fuel of which injection speed is accelerated at the middle stage of the fuel injection. As will be described in detail hereinafter, such unique phenomenon is practically employed in the second fuel injection mode of the fuel injection valve. The inventors have revealed that such speed acceleration of the injected atomized fuel is caused by presence of two phases possessed by the fuel injection, which are a first phase wherein air is given kinetic energy from the fine droplets of the atomized fuel and a second phase wherein the floating fine droplets is drawn by the flow of the atomized fuel with the assistance of the kinetic energy added air. Hitherto, only the first phase has been realized. The inventors consider that when the second phase becomes marked, the second phase overcomes the first phase to induce such a phenomenon that the speed of the atomized fuel from the fuel injection nozzle is sharply increased at the middle stage of the fuel injection.

Accordingly, when the fuel injection pressure "Pinj" is increased to a level higher than the critical value "Pcrit", the above-mentioned second fuel injection mode is established. As is seen from the graph of FIG. 1A, when the fuel injection pressure "Pinj" is further increased to values "P2", "P3" and "P4" (P1<P2<P3<P4), the penetration force of the injected fuel is increased accordingly.

In the present invention, the above-mentioned unique phenomenon revealed by the inventors is practically used. That is, by controlling the penetration force of the injected fuel in accordance with the operation condition of the engine, the fuel consumption characteristic and exhaust characteristic are improved.

In the present invention, under a lower engine speed, the fuel injection is carried out with a normal lower injection pressure so that with a lower penetration force, the atomized fuel from the injection nozzle produces a circulation of the atomized fuel in the cavity to produce an appropriate air-fuel mixture. While, under a higher engine speed, the fuel injection is carried out with a higher injection pressure so that with a higher penetration force, the atomized fuel from the injection nozzle produces an air-fuel mixture in a shorter time, the air-fuel mixture being substantially identical to the air-fuel mixture provided by the normal lower injection pressure with respect to the same ignition timing.

In the invention, under a lower engine load, the fuel injection pressure is reduced to reduce the penetration force thereby to produce an air-fuel mixture in a part of the cavity. While, under a higher engine load, the fuel injection pressure is increased to increase the penetration force thereby to produce a homogeneous air-fuel mixture in the cavity.

For improving the fuel consumption characteristic, the present invention proposes such a measure that after the fuel injection is carried out to produce an air-fuel mixture that is somewhat leaner than stoichiometric, an additional fuel injection is carried out at a timing just before the ignition by an ignition plug. With this measure, before the ignition, the air-fuel mixture placed around the ignition plug produces a condition that is appropriate for the fuel consumption characteristic.

It is said that when a fuel injection is carried out under a lower temperature condition of the engine, that is, under a condition wherein the temperature of engine cooling water is relatively low, the amount of unburnt hydrocarbons (HC) in the exhaust gas is increased. However, in the present invention, provision of the above-mentioned second phase suppresses or at least minimizes such undesired phenomenon. That is, under the second phase, the moving speed of air at the leading end of the injected atomized fuel is higher than that of the fine fuel droplets and thus there a partial Weber's value is small thereby inducing a reduction of the fuel droplets collected on the peripheral wall surface of the cavity. Thus, increasing the fuel injection pressure under such lower temperature condition of the engine is an effective way to reduce exhaust emission.

Although the above description is directed to fuel injection valves of the type-wherein the penetration force of the injected atomized fuel is controlled by the fuel injection pressure "Pinj", it is also possible to use fuel injection valves of a type that has a plurality of injection nozzles which are controllable in operation. That is, by controlling the number of the injection nozzles that are operative, the characteristic of the penetration force of the injected atomized fuel is varied or controlled. Furthermore, it is possible to use the injection valves of a type wherein the diameter of the fuel injection nozzle is controllable.

As will be described in detail in the following, in accordance with the present invention, the penetration force of the injected atomized fuel is varied in accordance with the operation condition of the engine. With this measure, a stratified combustion of mixture can be carried out in an expanded operation range of the engine, and deterioration of emission characteristic at a higher engine speed can be suppressed or at least minimized.

If desired, under the second fuel injection mode, a split fuel injection may be carried out.

In accordance with a first aspect of the present invention, there is provided a direct fuel injection type internal combustion engine, which comprises a combustion chamber having a piston movably received therein, the piston having a cavity; a fuel injection valve arranged to inject fuel against a wall of the cavity of the piston thereby to produce an air-fuel mixture; an ignition plug arranged to ignite the air-fuel mixture; and a control unit that is configured to carry out controlling the fuel injection valve to have a first fuel injection mode wherein a penetration force of an injected fuel sharply increases at an initial stage of the fuel injection and thereafter an increasing rate of the penetration force gradually lowers with passage of time and a second fuel injection mode wherein the penetration force of the injected fuel sharply increases at a middle stage of the fuel injection; and switching the first and second fuel injection modes in accordance with an operation condition of the engine.

In accordance with a second aspect of the present invention, there is provided a method for controlling a direct fuel injection type internal combustion engine. The engine comprises a combustion chamber having a piston movably received therein, the piston having a cavity; a fuel injection valve arranged to inject fuel against a wall of the cavity of the piston thereby to produce an air-fuel mixture; and an ignition plug arranged to ignite the air-fuel mixture. The method comprises controlling the fuel injection valve to have a first fuel injection mode wherein a penetration force of the injected fuel sharply increases at an initial stage of the fuel injection and thereafter an increasing rate of the penetration force gradually lowers with passage of time and a second fuel injection mode wherein the penetration force of the injected fuel sharply increases at a middle stage of the fuel injection; and switching the first and second fuel injection modes in accordance with an operation condition of the engine.

DETAILED DESCRIPTION OF THE INVENTION

In the following, the present invention will be described in detail with reference to the accompanying drawings.

Figure 1A:
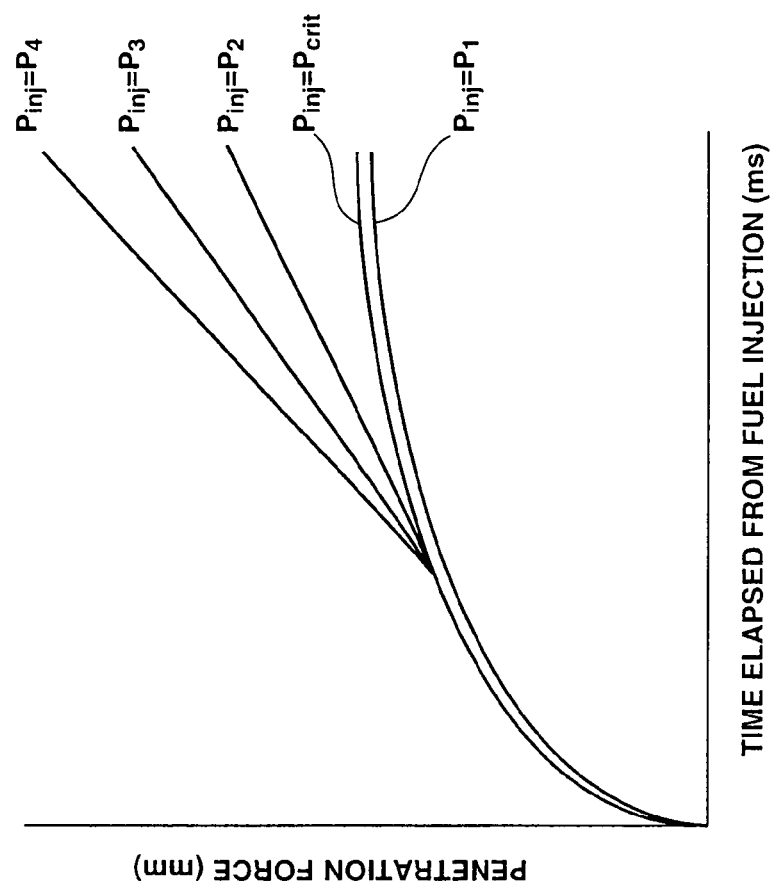
FIG. 1A is graph showing a relation between a time elapsed from a fuel injection and a penetration force of the injected fuel, in case wherein the fuel injection pressure is varied.
Figure 1B:
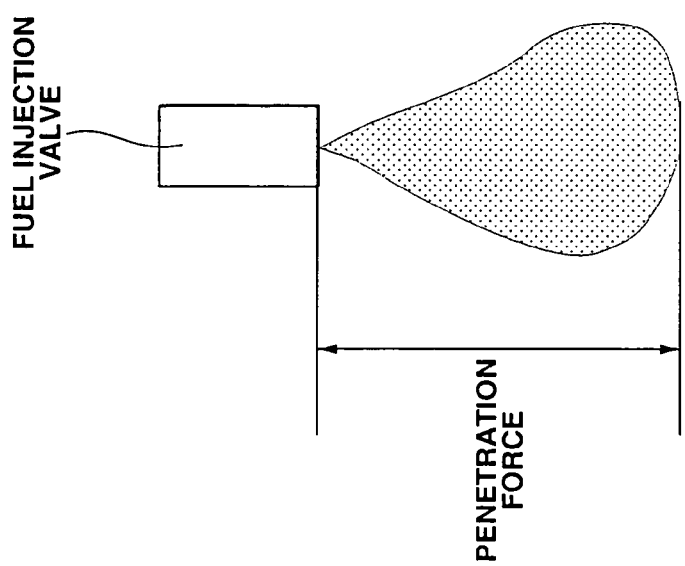
FIG. 1B is an illustration showing the shape of an injected atomized fuel from a fuel injection valve.
Figure 2:
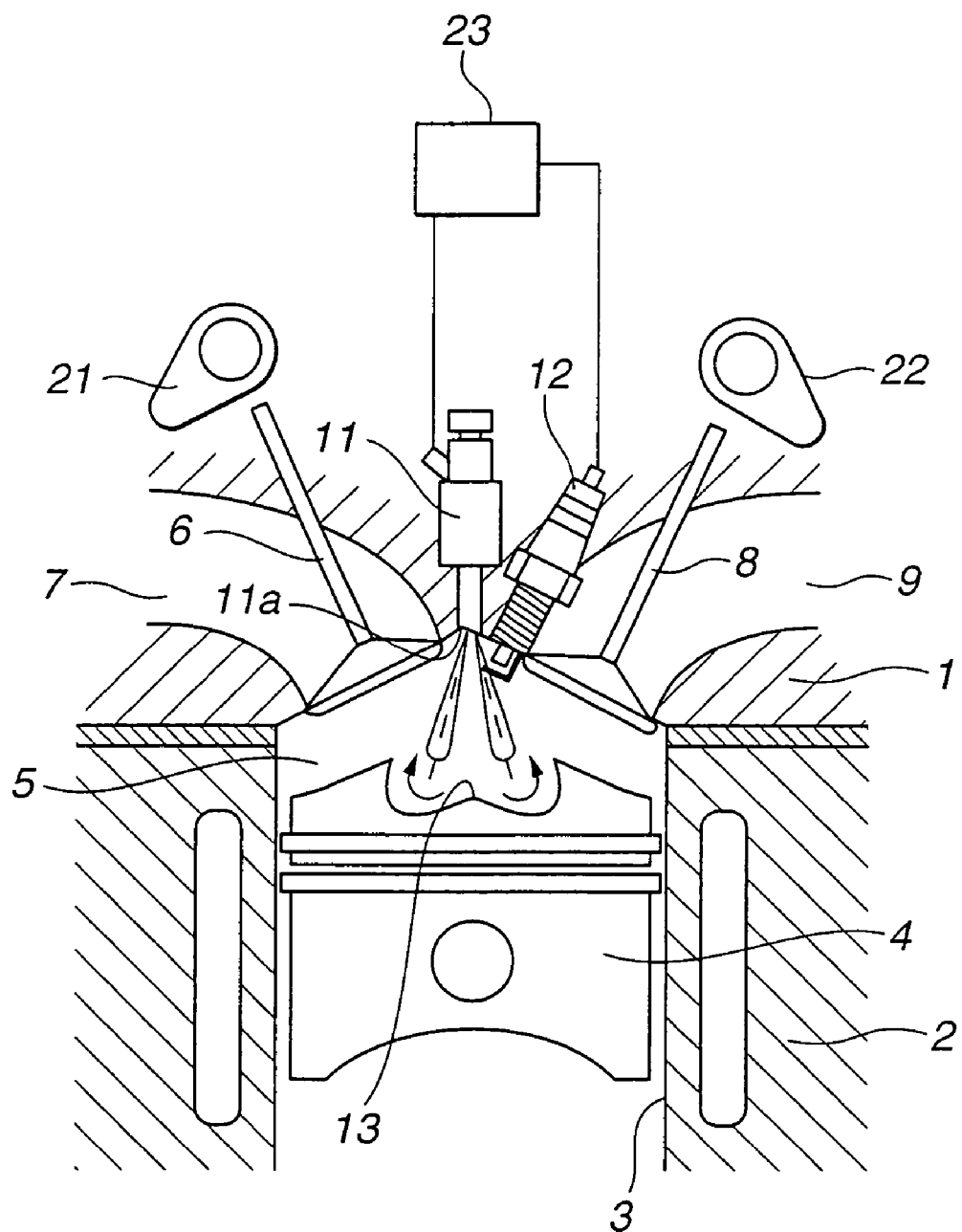
FIG. 2 is a sectional view of an essential part of a direct fuel injection type internal combustion engine according to the present invention.

Referring to FIG. 2, there is shown a direct fuel injection type internal combustion engine of the present invention.

As shown, the engine generally comprises a cylinder head 1 with intake and exhaust ports 7 and 9, a cylinder block 2 with cylinders 3 (only one is shown) and pistons 4 (only one is shown). A combustion chamber 5 is defined in each cylinder 3 above the corresponding piston 4. Combustion chamber 5 is communicated with air intake port 7 through an intake valve 6, and communicated with exhaust port 9 through an exhaust valve 8. Intake valve 6 and exhaust valve 8 are driven to open and close by intake and exhaust valve actuating cams 21 and 22, respectively.

As shown, at an upper wall surface of combustion chamber 5, that is, at a portion of cylinder head 1 that defines an upper center part of the combustion chamber 5, there is arranged a fuel injection valve 11 that has a fuel injection nozzle 11a from which fuel is injected toward piston 4. A fuel injection center line (viz., the line along which the fuel is injected from fuel injection nozzle 11a) is consistent with a center axis of the cylinder 3.

Beside fuel injection valve 11, there is arranged an ignition plug 12. As shown, a spark generation head of ignition plug 12 is located in the vicinity of fuel injection nozzle 11a of fuel injection valve 11.

Operation of fuel injection valve 11 and that of ignition plug 12 are controlled by instruction signals issued from an engine control unit 23. Control unit 23 has a microcomputer that comprises CPU, RAM, ROM and input and output interfaces. That is, in accordance with an operation condition of the engine, fuel injection operation of the valve 11 and ignition operation of the plug 12 are controlled.

Although not shown in the drawing, before reaching fuel injection valve 11, fuel is highly compressed by a fuel pump and regulated by a pressure regulator to have a desired high fuel injection pressure. Thus, when the valve 11 opens, the highly compressed fuel is injected into combustion chamber 5 from fuel injection nozzle 11a. The pressure regulator is controlled by engine control unit 23 so that the fuel injection pressure is controlled in accordance with the operation condition of the engine.

Furthermore, as is shown in the drawing, piston 4 is formed at a center of the crown part with a generally cylindrical cavity 13. The cavity 13 is of a reentrant type, so that under a stratified combustion mode of the engine, a stratified air-fuel mixture is produced in or over the cavity 13.

When the fuel injection is carried out in the compression stroke, particularly at an end half of the compression stroke, stratified combustion of air-fuel mixture is achieved, which enables operation of the engine at a leaner air-fuel ratio realizing improvement in a fuel consumption.

In the present invention, the fuel injection pressure is changed between a case wherein the engine speed is relatively low and a case wherein the engine speed is relatively high, so that the injected atomized fuel is able to have a penetration force that is suitable for producing stratified combustion of air-fuel mixture.

In the following, the detail of the present invention will be described with reference to FIGS. 3A, 3B, 4A and 4B.

Figure 3A:
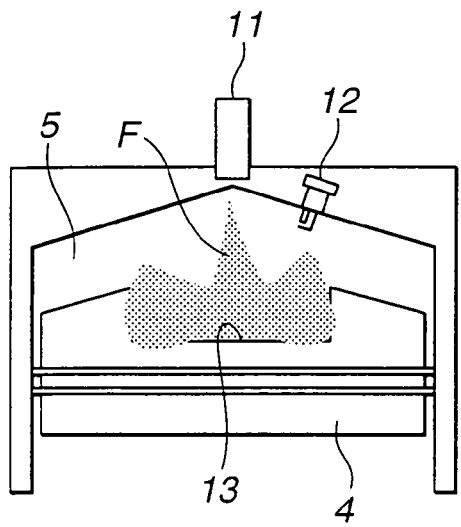
FIGS. 3A and 3B are drawings showing a process of producing an air-fuel mixture in a combustion chamber under a lower engine speed.
Figure 3B:
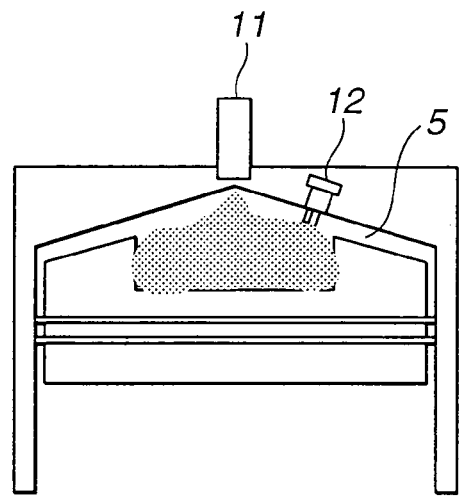
Figure 4A:
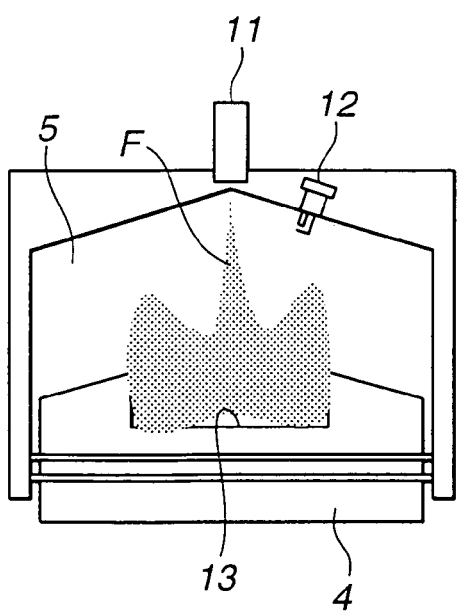
FIGS. 4A and 4B are drawings showing a process of producing an air-fuel mixture in the combustion chamber under a higher engine speed.
Figure 4B:
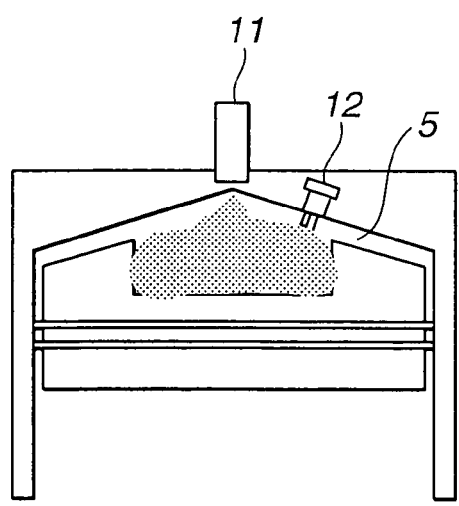

FIGS. 3A and 3B show a process of producing an air-fuel mixture in combustion chamber 5 under a lower engine speed, while FIGS. 4A and 4B shows a process for producing the air-fuel mixture in combustion chamber 5 under a higher engine speed.

When the engine speed is relatively low, the fuel injection is carried out with a normal injection pressure. As is seen from FIG. 3A, in such case, the fuel injection is carried out at an end stage of compression stroke. Upon injection, the injected atomized fuel "F" is forced to produce a circulation of the atomized fuel in the cavity 13 of piston 4 thereby to form a flying up air-fuel mixture. Upon this, ignition is applied to the air-fuel mixture by ignition plug 12 as is seen from FIG. 3B. With these steps, a clear boundary surface is produced between air party and air-fuel mixture party, that is needed for carrying out the stratified combustion of the mixture.

As is known, when the engine speed increases, the reciprocating speed of piston 4 is increased accordingly. This means that with increase of the engine speed, a real time for work possessed by piston 4 with respect to a unit crank angle becomes shorter. Accordingly, if, under a high speed operation of the engine, the fuel injection is made at the same timing as in the above-mentioned lower speed operation of the engine, the interval from termination of the fuel injection to the ignition fails to have a sufficient time for sufficiently vaporizing the fuel, which tends to cause deterioration of the exhaust characteristic (particularly, soot in the exhaust gas). If, for avoiding such undesirable phenomenon, the fuel injection timing is advanced, the interval from the fuel injection termination to the ignition can have a sufficient time for the fuel vaporization. However, in this case, the fuel injected at an initial stage of the fuel injection is subjected to a diffusion without colliding against the peripheral wall wall of cavity 13, which seriously affects production of the circulation of the atomized fuel in cavity 13.

While, in the present invention, when the engine speed is high, the fuel injection pressure is controlled higher than the critical value "Pcrit" to increase the penetration force of the injected atomized fuel, and at the same time, as is seen from FIG. 4A, the fuel injection is started at a timing that is somewhat advanced as compared with the timing set when the engine speed is low, that is, at a timing that is nearer to BDC (bottom dead center) of intake stroke than that set when the engine speed is low. With this measure, due to the higher penetration force given to the injected atomized fuel "F", the injected atomized fuel "F" can assuredly reach the cavity 13 of piston 4 and thus appropriate air-fuel mixture is produced in and over the cavity 13. Furthermore, as shown in FIG. 4B, the interval from the fuel injection termination to the ignition can have a sufficient time for the vaporization of fuel.

Figure 5:
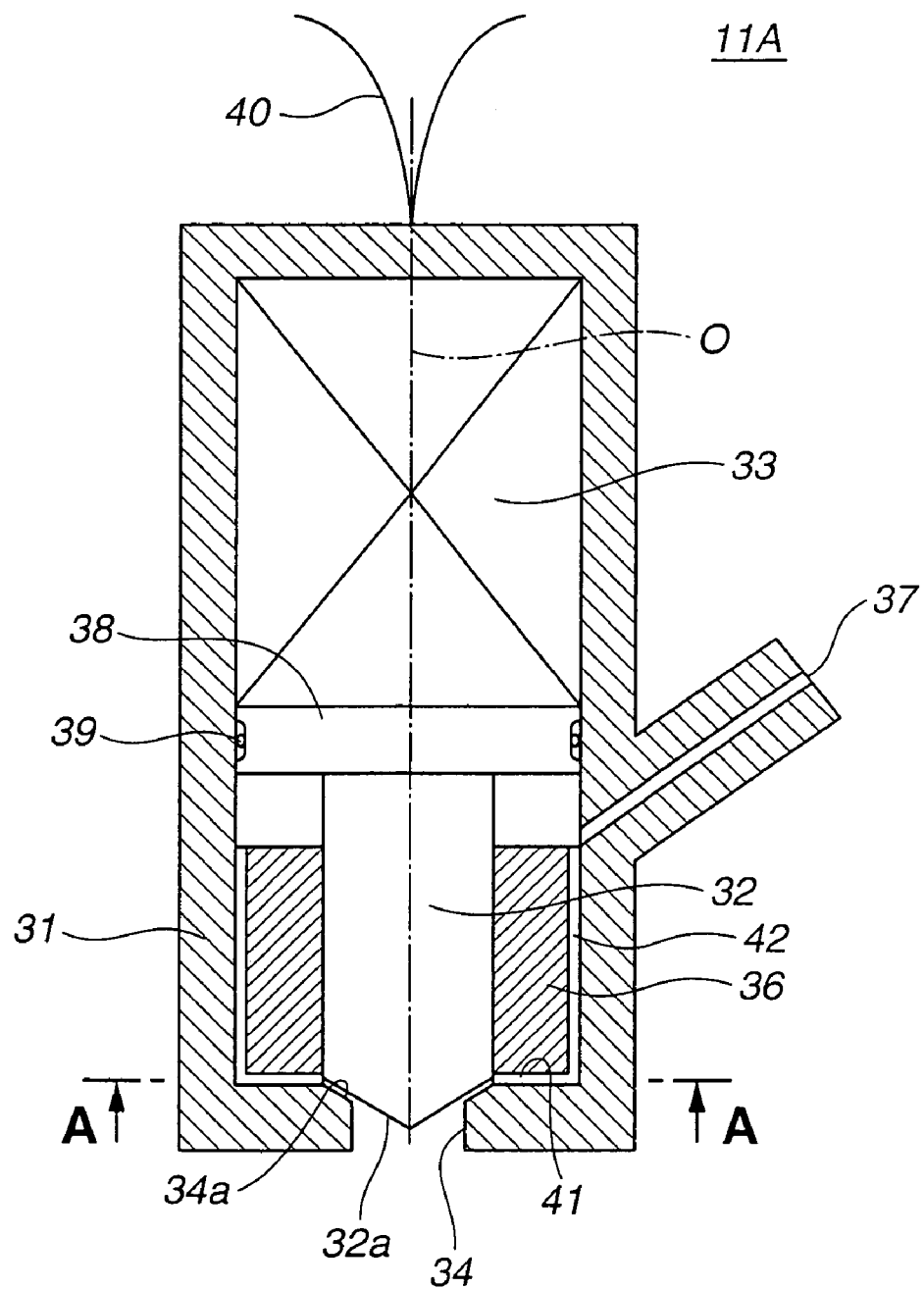
FIG. 5 is a schematically illustrated sectional view of a swirl type fuel injection valve.
Figure 6:
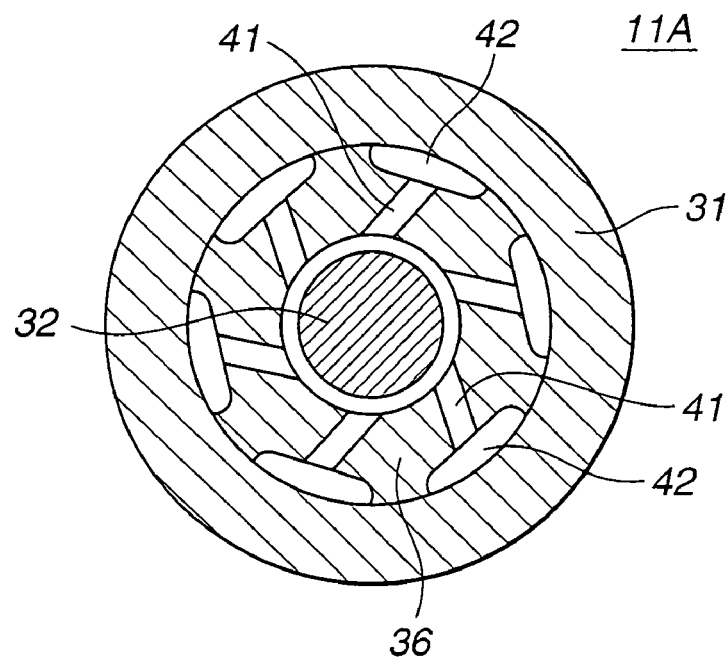
FIG. 6 is a sectional view taken along the line "A—A" of FIG. 5.

FIGS. 5 and 6 show a swirl type fuel injection valve 11A that can be used as the fuel injection valve 11.

As is seen from FIG. 5, the swirl type fuel injection valve 11A comprises a cylindrical housing 31 that has at its leading end a circular fuel injection nozzle 34. The nozzle 34 is concentric with an axis "O" of housing 31 and tapered at its inside part 34a, as shown. Within housing 31, there is axially movably received a needle valve 32 that has a cone-shaped head 32a that is intimately contactable with the tapered inside part 34a of nozzle 34. That is, when cone-shaped head 32a of needle valve 32 is seated onto tapered inside part 34a, valve 11A assumes its close position. An actuator 33 constructed of a piezoelectric element is installed in housing 31 to actuate needle valve 32. For energizing actuator 33, electric wires 40 from a power source (not shown) are connected to actuator 33. A circular partition plate 38 is axially movably received in housing 31 at a position between needle valve 32 and actuator 33. The needle valve 32, partition plate 38 and actuator 33 are connected to constitute a single unit. The partition plate 38 has therearound a seal ring 39 for assuring a hermetical sealing between partition plate 38 and housing 31. A cylindrical projection is formed on housing 31, that has therein a fuel inlet passage 37 connected to the interior of housing 31. A highly compressed fuel from a fuel pump (not shown) is led into the interior of housing 31 through fuel inlet passage 37. When, actuator 33 is energized, the entire length of the same is somewhat reduced due to nature of the piezoelectric element. Upon this, needle valve 32 is lifted up to open nozzle 34 permitting injection of the highly compressed fuel in housing 31 to the outside, that is, toward cavity 13 of the piston 4.

Within a lower part of housing 31, there is arranged an annular swirl chip 36 that surrounds needle valve 32. As is seen from FIG. 6, annular swirl chip 36 is formed at its annular lower end and its cylindrical outer surface with equally spaced six fuel guide grooves 41 and equally spaced six fuel flow passages 42 respectively. These fuel guide grooves 41 and fuel flow passages 42 are respectively connected to one another. As shown in the drawing, each fuel guide groove 41 inclines with respect to an imaginary plane that extends along the axis of annular swirl chip 36, and each fuel flow passage 42 extends axially. More specifically, each fuel guide groove 41 is so oriented as to extend in a tangential direction of cylindrical needle valve 32. With such inclined arrangement of fuel guide grooves 41, the compressed fuel directed toward nozzle 34 can be applied with a swirl force.

Thus, when, due to lifting of needle valve 32, fuel injection valve 11A is turned open, the compressed fuel from the six fuel flow passages 42 is forced to run in the six fuel guide grooves 42 toward injection nozzle 34 in the tangential direction of needle valve 32. Thus, as is mentioned hereinabove, the fuel is applied with a suitable swirl force and thus, the injected atomized fuel can take a hollow cone shape in combustion chamber 5.

Figure 8:
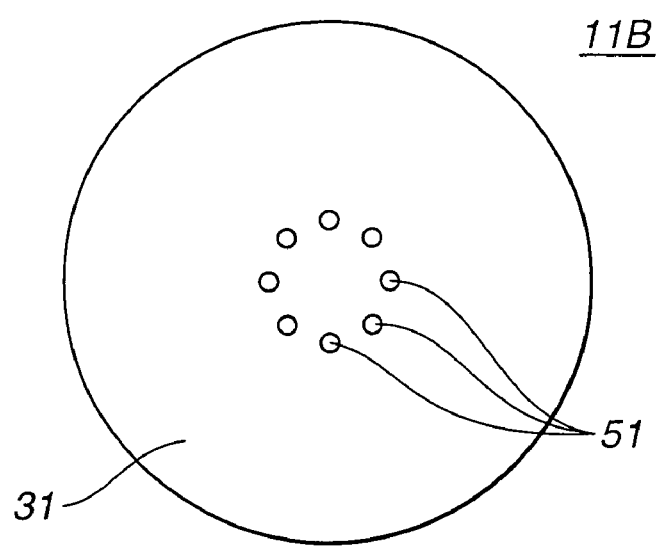
FIG. 8 is a view taken from the direction of the arrow "B" of FIG. 7.
Figure 7:
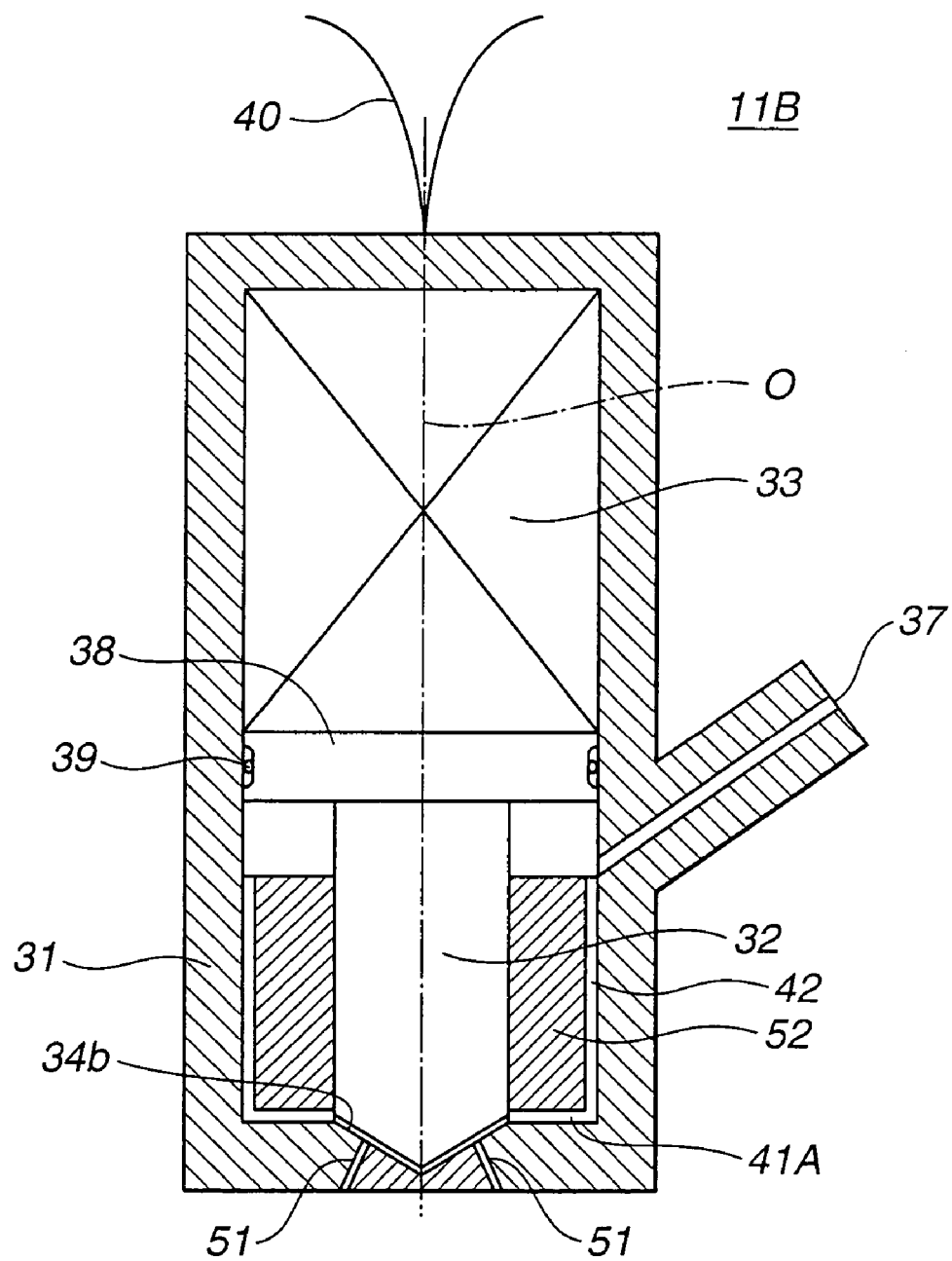
FIG. 7 is a schematically illustrated sectional view of a multi-nozzle type fuel injection valve.

FIGS. 7 and 8 show a multi-nozzle type fuel injection valve 11B that can be used also as the fuel injection valve 11.

Since the basic construction of this valve 11B is substantially the same as that of the above-mentioned swirl type valve 11A, only portions or parts that are different from those of the swirl type valve 11A will be described in detail in the following. The same parts are denoted by the same numerals as in the swirl type.

In this multi-nozzle type fuel injection valve 11B, the housing 31 has at its leading end eight equally spaced fine fuel injection nozzles 51 that are arranged circumferentially around the axis "O" of housing 31. As shown in FIG. 7, the leading end of housing 31 is formed at its inside surface with a cone-shaped recess 34b to which the eight injection nozzles 51 are exposed. The cone-shaped head 32a of needle valve 32 is intimately contactable with the cone-shaped recess 34b. That is, when cone-shaped head 32a is seated onto the cone-shaped recess 34b, the valve 11B assumes its close position. The fuel injection nozzles 51 are inclined relative to the axis "O" of housing 31. More specifically, each fuel injection nozzle 51 is so inclined that a distance between nozzle 51 and the axis "O" increases with increase of the distance from cone-shaped recess 34b. An annular chip 52 is arranged to surround needle valve 32. The annular chip 52 is formed at its annular lower end and its cylindrical outer surface with equally spaced fuel guide grooves 41A and equally spaced fuel flow passages 42 respectively, like in case of the above-mentioned swirl type valve 11A. However, in the valve of the multi-nozzle type 11B, fuel guide grooves 41A of the annular chip 52 are arranged to extend radially outward from the axis "O" of housing 31.

When, due to lifting of needle valve 32, fuel injection valve 11B is turned open, the compressed fuel in fuel flow passages 42 of annular chip 52 is forced to run in the fuel guide grooves 41A toward the eight fine nozzles 51, so that the injected atomized fuel from the nozzles 51 can take a hollow cone shape in combustion chamber 5.

The entire contents of Japanese Patent Application 2003-288318 filed Aug. 7, 2003 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A direct fuel injection type internal combustion engine, comprising:
   a combustion chamber having a piston movably received therein, the piston having a cavity;
   a fuel injection valve arranged to inject fuel against a wall of the cavity of the piston thereby to produce an air-fuel mixture;
   an ignition plug arranged to ignite the air-fuel mixture; and
   a control unit that is configured to carry out:
      controlling the fuel injection valve to have a first fuel injection mode wherein a penetration force of an injected fuel sharply increases at an initial stage of the fuel injection and thereafter an increasing rate of the penetration force gradually lowers with passage of time and a second fuel injection mode wherein the penetration force of the injected fuel sharply increases at a middle stage of the fuel injection; and
      switching the first and second fuel injection modes in accordance with an operation condition of the engine.

2. A direct fuel injection type internal combustion engine as claimed in claim 1, in which the control unit controls the fuel injection valve in such a manner that the valve assumes the first fuel injection mode when a pressure of the injected fuel is relatively low and assumes the second fuel injection mode when the pressure of the injected fuel is relatively high.

3. A direct fuel injection type internal combustion engine as claimed in claim 2, in which the control unit controls the fuel injection valve in such a manner that the valve assumes the first fuel injection mode when an engine speed is relatively low and assumes the second fuel injection mode when the engine speed is relatively high.

4. A direct fuel injection type internal combustion engine as claimed in claim 3, in which the control unit controls the fuel injection valve in such a manner that the pressure of the injected fuel increases with increase of the engine speed.

5. A direct fuel injection type internal combustion engine as claimed in claim 1, in which the control unit controls the fuel injection valve in such a manner that the valve assumes the first fuel injection mode when an engine load is relatively low and assumes the second fuel injection mode when the engine load is relatively high.

6. A direct fuel injection type internal combustion engine as claimed in claim 5, in which the control unit controls the fuel injection in such a manner that the pressure of the injected fuel increases with increase of the engine load.

7. A direct fuel injection type internal combustion engine as claimed in claim 5, in which the control unit controls the fuel injection valve in such a manner that under the second fuel injection mode, split fuel injection is carried out.

8. A direct fuel injection type internal combustion engine as claimed in claim 2, in which the control unit controls the fuel injection valve in such a manner that the valve assumes the second fuel injection mode when the temperature of cooling water of the engine is relatively low, and assumes first fuel injection mode when the temperature of the engine cooling water is relatively high.

9. A direct fuel injection type internal combustion engine as claimed in claim 2, in which the fuel injection valve is of a swirl type that is constructed to apply a swirl force to the injected fuel.

10. A direct fuel injection type internal combustion engine as claimed in claim 2, in which the fuel injection valve is of a multi-nozzle type that has a plurality of fuel injection nozzles arranged circumferentially.

11. A direct fuel injection type internal combustion engine as claimed in claim 1, in which the fuel injection valve has a plurality of fuel injection nozzles which are controllable in operation, and in which the control unit controls the fuel injection valve in such a manner that when the valve assumes the first fuel injection mode, the number of the fuel injection nozzles that are operative is reduced, and when the valve assumes the second fuel injection mode, the number of the operative fuel injection nozzles is increased.

12. A direct fuel injection type internal combustion engine as claimed in claim 1, in which the fuel injection valve has a fuel injection nozzle of which diameter is controllable, and in which the control unit controls the fuel injection valve in such a manner that when the valve assumes the first fuel injection mode, the diameter of the fuel injection nozzle is increased, and when the valve assumes the second fuel injection mode, the diameter of the fuel injection nozzle is reduced.

13. A direct fuel injection type internal combustion engine as claimed in claim 1, in which the fuel injection valve is arranged to inject fuel along an axis of a corresponding cylinder of the engine and in which the cavity is located at a center part of the piston.

14. In a direct fuel injection type internal combustion engine comprising a combustion chamber having a piston movably received therein, the piston having a cavity; a fuel injection valve arranged to inject fuel against a wall of the cavity of the piston thereby to produce an air-fuel mixture; and an ignition plug arranged to ignite the air-fuel mixture, a method of controlling the engine, comprising:

controlling the fuel injection valve to have a first fuel injection mode wherein a penetration force of the injected fuel sharply increases at an initial stage of the fuel injection and thereafter an increasing rate of the penetration force gradually lowers with passage of time and a second fuel injection mode wherein the penetration force of the injected fuel sharply increases at a middle stage of the fuel injection; and switching the first and second fuel injection modes in accordance with an operation condition of the engine.

* * * * *